United States Patent [19]
Beckmann

[11] B 4,014,003
[45] Mar. 22, 1977

[54] CIRCUIT FOR CONTROLLING A SEMI-CONDUCTOR VALVE

[75] Inventor: Oskar Beckmann, St. Polten, Austria

[73] Assignee: Siemens Aktiengesellschaft, Munich, Germany

[22] Filed: Dec. 5, 1974

[21] Appl. No.: 529,925

[44] Published under the second Trial Voluntary Protest Program on March 30, 1976 as document No. B 529,925.

[30] Foreign Application Priority Data

Dec. 5, 1973 Germany .................... 2360670

[52] U.S. Cl. ........................ 340/171 R; 343/225
[51] Int. Cl.² .................................. G08B 23/00
[58] Field of Search ....... 343/225; 340/224, 171 R; 325/8, 113, 152, 440

[56] References Cited
UNITED STATES PATENTS

| | | | |
|---|---|---|---|
| 3,253,588 | 5/1966 | Vuilleumier | 340/224 X |
| 3,643,260 | 2/1972 | Clarke | 343/225 R |
| 3,713,101 | 1/1973 | Piccone | 343/225 X |
| 3,798,642 | 3/1974 | Augenblick | 343/225 X |
| 3,806,905 | 4/1974 | Strenglein | 340/224 R |

Primary Examiner—Harold I. Pitts
Attorney, Agent, or Firm—Kenyon & Kenyon Reilly Carr & Chapin

[57] ABSTRACT

The invention concerns a circuit arrangement for the wireless transmission of a control signal to the control path of a controlled semiconductor valve, particularly a thyristor. The control signal is provided here to modulate a high-frequency transmitter which is arranged at some distance from a high-frequency receiver which contains a demodulator, whose output signal is applied to the control path of the semiconductor valve. For return transmission of information regarding the state of the semiconductor valve, the receiving antenna of the high-frequency receiver is provided as a transmitting antenna and the transmitting antenna of the high-frequency transmitter as a receiving antenna.

13 Claims, 4 Drawing Figures

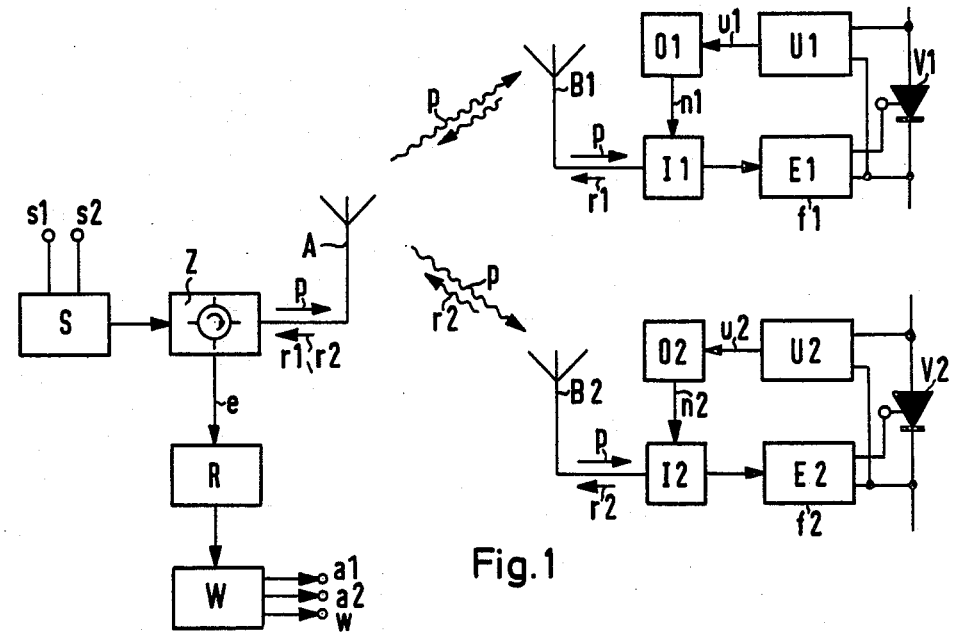
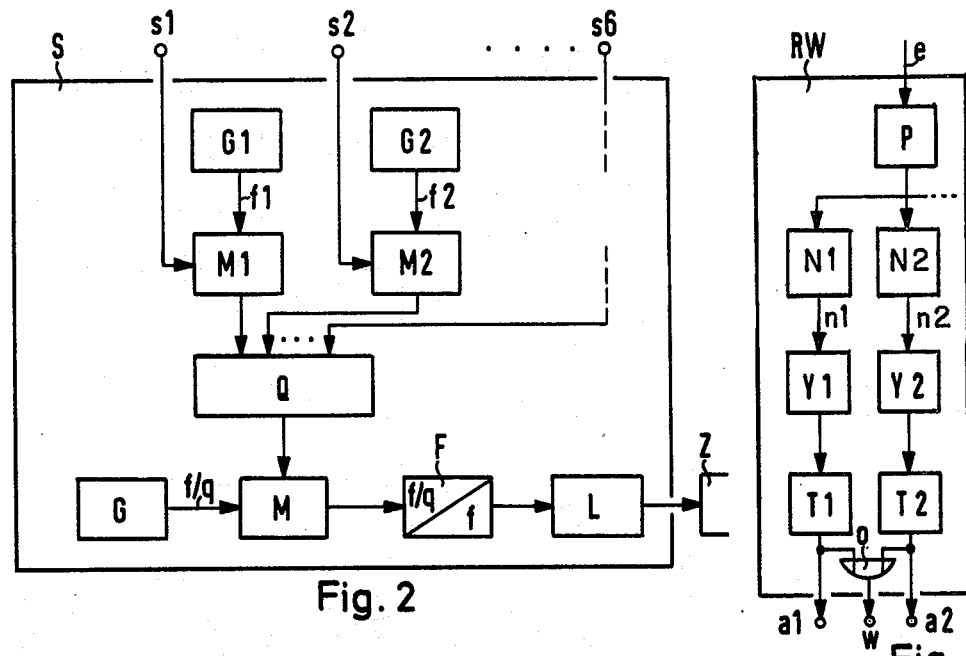
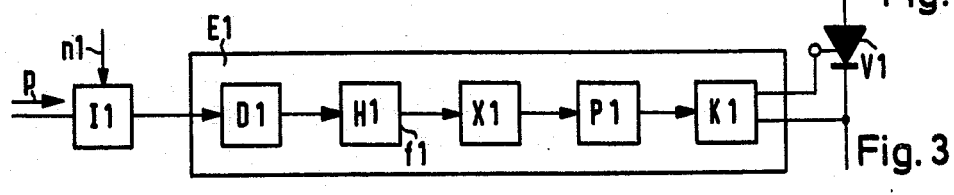

CIRCUIT FOR CONTROLLING A SEMI-CONDUCTOR VALVE

BACKGROUND OF THE INVENTION

1. Field of the Invention

The invention concerns a circuit arrangement for the wireless transmission of a control signal to the control path of a controlled semiconductor valve, particularly a thyristor, which can be used preferably for a converter for high voltage.

2. Description of the Prior Art

A control signal from a control signal transmitter is always transmitted to the control path of a controlled semiconductor valve by wireless means, i.e., electrically separated, if a particularly large potential difference exists between the control signal transmitter and the semiconductor valve, if there is a particularly large or small distance between them, if both are poorly accessible, or if the control signal transmitter and the semiconductor valve move relative to each other.

A circuit arrangement of the kind mentioned above is known from the German Offenlegungsschrift No. 1,916,875. This involves a speed control device for an electric machine. Here, the rotating armature winding can be short-circuited via a receiver which contains electronic switching elements. The transmitter is positioned at the stationary exciter. It is possible to use as the transmitter for the control signal a light source (e.g., an incandescent lamp, light-emitting diode) and as the switching element for controlling the armature current a light-controlled electronic component (e.g., a phototransistor, photothyristor). However, the control signal can also be transmitted electromagnetically, e.g., by means of a transformer, the primary winding of which is arranged as the control signal transmitter and whose secondary winding is arranged in the control circuit of a component of the receiver, or by means of a magnet as the control signal transmitter and a magnetic field-controlled semiconductor resistor as the receiver. It is also possible to transmit the control signal electrostatically.

A circuit arrangement of the kind mentioned above is also known from the German Patent No. 1,538,099. This concerns a firing circuit for a controlled semiconductor valve. This firing circuit is designed so that it derives the firing energy from the voltage at the anode-cathode path of the semiconductor valve. In this arrangement, a pulse capacitor which can be discharged by means of an auxiliary switch on to the control electrode-cathode path of the semiconductor valve, is charged by means of this voltage. For the auxiliary switch a light-controlled thyristor is provided which can be triggered by light radiation from a light source. The light source is considered here as the control signal transmitter. It may be arranged at some distance from the semiconductor valve. This firing circuit is particularly well suited for a thyristor which is arranged, possibly in series with other thyristors, in a converter for high voltage.

The known circuit arrangements therefore make use of a light-optical, electromagnetic or capacitive transmission of information in the wireless transmission. With light-optical transmission, dirt which settles on the optical components in the transmission path can be a disturbance in the long term. With electromagnetic transmission, as well as with capacitive transmission, one is in general tied to a short coupling distance between the control signal transmitter and the semiconductor valve, which is frequently not permissible, however, for reasons of a large potential difference, or is not possible in the case of rotating machines.

A circuit arrangement for the wireless transmission of a control signal to the control path of a controlled semiconductor valve, in which the control signal is provided for modulation of a high-frequency transmitter, which is arranged at some distance from a high-frequency receiver containing a demodulator whose output signal is fed to the control path of a semiconductor valve, is the subject of another application on file in the United States Patent Office, the assignee of which is the same as the assignee of this application.

In such a circuit arrangement it is important to determine whether during the operation of the controlled semiconductor valve a short-circuit has occurred in its anode-cathode path. If several such semiconductor valves are combined in a converter, for instance, it is also of interest to learn how many and which semiconductor valves have failed.

It is an object of the invention to provide a circuit wherein a return message regarding the failure of one or possibly several semiconductor valves is available with little technical and apparatus expenditure on the transmitter side.

SUMMARY OF THE INVENTION

According to the invention, this problem is solved in the circuit arrangement mentioned at the beginning by providing the control signal for the modulation of a high-frequency transmitter which is arranged at some distance from a high-frequency receiver containing a demodulator whose output signal is applied to the control path of the semiconductor valve, and by providing for the return transmission of information regarding the state of the semiconductor valve from the receiving antenna of the high-frequency receiver acting as a transmitting antenna and the transmitting antenna of the high-frequency transmitter acting as a receiving antenna.

The transmitting antenna and the receiving antenna are utilized here in both directions for the transmission of information. In this manner, a wireless return message regarding the state of the semiconductor valve can be accomplished from the receiving side to the transmitting side with little expenditure.

A particularly preferred further embodiment is distinguished by the feature that an impedance member whose impedance is controlled as a function of a characteristic quantity of the controlled semiconductor valve, is arranged at the receiving antenna of the high-frequency receiver. At the transmitting antenna of the high-frequency transmitter a return message receiver is arranged which separates from the return signal, which is reflected at the impedance member, radiated by the receiving antenna of the high-frequency receiver, and intercepted by the transmitting antenna, a signal regarding the state of the semiconductor valve.

A small expenditure and low power are sufficient here, because no separate energy source is necessary for the return transmission, in that the high-frequency power used for the outgoing radiation, which arrives at the receiving antenna of the receiver, is partially reflected at the controllable impedance member and is utilized for the wireless transmission of the return message.

In particular, for controlling the impedance member an oscillator with an assigned (or characteristic) frequency is provided, which can be controlled as a function of the reverse voltage at the semiconductor valve. This assigned-frequency oscillator may in principle be frequency-or amplitude-modulated.

For reasons of interference immunity one will prefer frequency modulation of the high-frequency transmitter and amplitude control of the assigned-frequency oscillator. Then, the circuit arrangement can be developed further such that the assigned frequency of the assigned-frequency oscillator is constant, and that the return message receiver is tuned to this assigned-frequency. The assigned frequency oscillator should control with its assigned frequency the impedance member as to its impedance and thereby produce amplitude modulation in the reflected return message signal.

However, the anode-cathode path of the semiconductor valve can also be connected with a voltage monitoring circuit which turns on and off the output signal of the assigned-frequency oscillator as a function of the reverse voltage at the semiconductor valve.

As the impedance member, a capacity diode (varactor) or a PIN diode can be used.

It is particularly important to achieve in the transmitter a sharp separation of the transmitted signal emitted by the transmitting antenna from the return message signal received by the same transmitting antenna. This is preferably achieved by different kinds of modulation. If therefore, the transmitter signal is frequency-modulated, the reflected return message signal should be amplitude-modulated. If a multiplicity of semiconductor valves is involved, the control signals should be transmitted by different subcarrier frequencies.

BRIEF DESCRIPTION OF THE DRAWINGS

FIG. 1 shows a circuit arrangement for the wireless transmission of two control signals with wireless return transmission.

FIG. 2 shows an embodiment of the control transmitter.

FIG. 3 shows an embodiment of the receiver.

FIG. 4 shows an embodiment of a combination of the return message receiver and evaluation circuit.

DESCRIPTION OF THE INVENTION

FIG. 1 shows a control transmitter S to which is applied via an input terminal a control signal $s1$ for triggering a semiconductor valve V1, in particular, a thyristor. Instead of this one semiconductor valve V1, several series, or parallel connected semiconductor valves may also be controlled, which must be triggered simultaneously. Into the control transmitter S is applied via another input terminal, another control signal $s2$, which is used for triggering a further semiconductor valve V2 or a group of such semiconductor valves.

Only two semiconductor valves V1, V2 are shown in FIG. 1, but a plurality could be controlled in the manner described herein. It is assumed that both semiconductor valves V1, V2 belong to the same converter for high voltage, e.g., to the same converter for a high-voltage d-c transmission system, but that they are arranged in different branches and are to be triggered at different firing times.

The control transmitter S delivers a transmission signal $p$ to a transmitting antenna A via a circulator Z. The frequency of this transmitting signal $p$ is, for instance, in the GHz region. The transmitted signal $p$ arrives by radio transmission at a number of receiving antennas B1, B2 . . . , of which only the two receiving antennas B1, B2 are shown. The wireless transmission of the transmitted signal $p$ is indicated by the wavy arrows in FIG. 1. The receiving antennas B1, B2 are mounted at some distance from the transmitting antenna A. The minimum distance is generally determined by the safety distance which must be observed at the maximum voltage of the converter by its semiconductor valves. In FIG. 1, only two receiving antennas B1 and B2 are shown. In general, such a receiving antenna B1, B2 will be associated with each of the existing semiconductor valves V1, V2.

Each receiving antenna B1, B2 is assigned, together with a receiver E1, E2, each of which contains a demodulator, to one of the semiconductor valves V1, V2. The individual receivers E1, E2 are of largely identical design. They have the property that they select from a multiplicity of control signals presented, the control signal $s1$ or $s2$ assigned to them and to pass a trigger signal to the control path of the semiconductor valve V1 or V2, respectively, in dependence on this control signal $s1$, $s2$.

Between the receiving antenna B1, B2 and the receiver E1, E2, respective controllable impedance members I1, I2 are arranged. A varactor or a PIN diode may in each case be provided as the impedance member I1, I2. Its impedance can in each case be modulated with an assigned (or characteristic) frequency $n1$ or $n2$ by an assigned-frequency oscillator O1, O2. The characteristic frequencies $n1$, $n2$ delivered by the characteristic-frequency oscillators O1, O2 characterize the semiconductor valve, V1 or V2, in question. The characteristic frequency $n1$ is thus assigned to the semiconductor valve V1 and the characteristic frequency $n2$ to the semiconductor valve V2. The individual characteristic frequencies $n1$, $n2$ of all the semiconductor valves V1, V2 . . . are different from each other and may be spaced from each other, for instance, by 1 kHz.

The transmitted signal $p$, received by the receiving antenna B1, B2 is applied via the impedance member I1, I2, to the receiver E1, E2 and is demodulated there. Thereby it is ascertained whether the demodulated signal is in fact provided for triggering the valve V1 or V2. If this is the case, the demodulated signal is used for triggering the semiconductor valve V1 or V2.

The characteristic-frequency oscillators O1, O2 are provided for the return transmission of information regarding the state of the respective semiconductor valve V1 or V2, and so are, in particular, voltage monitoring circuits U1, U2 for ascertaining the state of the semiconductor valves V1, V2 and which measure the anode-cathode voltages of the semiconductor valves V1 and V2. If the anode-cathode voltage is zero, i.e., if a disturbance is present, the voltage monitoring circuit U1, U2 sends as the output signal $u1$ or $u2$ a cutoff signal to the characteristic-frequency oscillator O1 or O2, respectively. This cut-off signal $u1$, $u2$ blocks the output voltage of the characteristic-frequency oscillator O1, O2, i.e., it makes this output voltage zero.

In the undisturbed case, when a reverse voltage is present at the semiconductor valves V1, V2 each voltage monitoring circuit U1, U2 delivers no cut-off signal. The characteristic-frequency oscillators O1, O2 then change the value of the associated impedance member I1, I2, in accordance with the characteristic frequency $n1$, $n2$. The arriving transmitter signal $p$ is thereby modulated. This modulation causes the transmitter signal $p$ to be partially reflected at the controllable impedance I1, I2 and to be radiated back again by way of the receiving antenna B1, B2 as an amplitude-modulated return message signal $r1$, $r2$. Part of the radiated power gets back to the transmitting antenna A via the transmission path.

The mixture of return message signals $r1$, $r2$ received by the transmitting antenna A is applied via the circulator Z to a return message receiver R as the received signal $e$. This return message receiver R selects the return message signals $r1$, $r2$, which are reflected, modulated, by all the receiving antennas B1, B2, according to their characteristic frequencies $n1$, $n2$ .... If one of the semiconductor valves V1, V2 is disturbed, the corresponding characteristic frequency $n1$ or $n2$ is missing in the received signal $e$. An evaluator circuit W processes the signals delivered by the return message receiver R further, so that one obtains information regarding the identification number, location and/or number of the defective semiconductors V1, V2. The evaluator circuit W delivers at its output terminals, indicating signals $a1$ or $a2$, associated with the valves V1, V2, which can be used to operate indicator lamps. The evaluator circuit W delivers further a sum signal $w$, which can be used to trigger an alarm.

So that the transmitted signal $p$ and the mixture of reflected return message signals $r1$, $r2$ do not mutually influence each other, various measures must be taken. First of all, different types of modulation should be provided. Here, the transmitted signal $p$ may be frequency-modulated by the control signals $s1$, $s2$ and the returned receiving signal $e$, amplitude-modulated as already mentioned. However, the procedure can also be reversed. The transmitted signal $p$ can be amplitude-modulated and the receiving signal $e$ frequency-modulated. The first-named solution, however, is more advantageous, as a frequency-modulated transmitter signal $p$ is less susceptible to interference that may be caused by corona discharges at the converter. A frequency-modulated transmission signal $p$ can be processed at the valve side more easily and in a more interference-proof manner.

The separation of the transmitted signal $p$ and the receiving signal $e$ is achieved by means of the circulator Z. In place of a circulator Z, any other customary signal separator filter can be used. As a third measure, care should be taken that different frequencies are used for the characteristic frequencies $n1$, $n2$ on the one hand and, in the case of frequency modulation of the transmitted signal $p$, for the modulation frequencies in the control transmitter S.

FIG. 2 shows an embodiment example of the control transmitter S. It is assumed that the semiconductor valves to be triggered are arranged in a converter in a three-phase bridge circuit. A control signal generator (not shown), which, for instance, is part of a control loop, delivers control signals $s1$, $s2$ ... $s6$, which are to be used to fire the semiconductor valves in the six branches of the converter. The frequency of these control signals $s1$, $s2$, ... $s6$ is, for instance, 50 Hz.

According to FIG. 2, the control transmitter S contains a frequency generator G1, e.g., a quartz oscillator, which delivers a signal with the frequency $f1$. This frequency $f1$ is constant. It is to be, for instance, in the range from 6.7 to 11 MHz. This frequency $f1$ will be called in the following the subcarrier frequency $f1$. The signal delivered by the frequency generator G1 is applied to a modulator M1, which is provided for amplitude modulation. An electronic switch, e.g., a switching transistor, may be provided as the modulator M1. The control signal $s1$ is applied to the modulation input M1, e.g., the base of the switching transistor. This control signal $s1$ is provided for the simultaneous triggering of all the semiconductor valves V1 of one branch of the converter. The signal delivered by the modulator M1 is a signal of the subcarrier frequency $f1$, which is amplitude-modulated by the control signal $s1$, i.e., for instance, with 50 Hz.

For triggering the semiconductor valves in the other five branches of the converter, the further controll signals S2 to S6 are provided. For each of these control signals $s2$ to $s6$, a frequency generator-modulator combination is provided. The control signal $s2$ is applied, for instance, to the modulation input of a modulator M2, which is energized by a frequency generator G2 with a signal of the subcarrier frequency $f2$. The individual frequency generators G1, G2 ... have different subcarrier frequencies $f1, f2$ ... The output voltages of all modulators M1, M2 ... are combined, i.e., added together. For this purpose, an interlinking point Q is provided, which may be a resistor. The output voltages combined at the interlinking point Q are applied to a phase modulator M.

The phase modulator M is preceded by a carrier generator G, which may be designed as a quartz oscillator and delivers a carrier signal with a constant frequency $f/q$ of 51 MHz. The carrier signal delivered by the carrier generator G is frequency-modulated in the phase modulator by the sum signal of the interlinking point Q applied to its modulation input. The frequency-modulated output signal of the phase modulator M is fed to a frequency multiplier F. This frequency multiplier F may, for instance, have a multiplication factor $q = 48$. The frequency of the carrier generator $f/q$ is thereby increased by the factor $q$ to the frequency value $f$. At the output of the frequency multiplier F, a signal therefore appears which has a carrier frequency $f$ of, for instance, 2448 MHz. This signal is amplified by means of a power amplifier L to the necessary output power, which may be, for instance, 2W. The output signal of the output amplifier L is already the transmitting signal $p$. It is applied to transmitting antenna A by means of the circulator Z in accordance with FIG. 1. The transmission signal $p$ transmitted by the transmitting antenna A therefore has a carrier frequency $f$ of 2.448 GHz. This carrier frequency $f$ lies in the so-called International Industrial Band. Deviating therefrom, any other frequency above 300 MHz can be used as the carrier frequency $f$.

Regarding the control transmitter S, the following can be said in summary: A carrier signal with a carrier frequency $f$ is used, upon which six subcarrier signals are modulated by means of frequency modulation. In the frequency diagram, the subcarrier signals result in six subcarriers each above and/or below the carrier frequency $f$. These subcarriers may have, in particular, equal frequency spacings from each other. The subcarrier frequencies $f1, f2$ ... can be derived from the output frequency of a single frequency generator, which is used in place of the individual frequency generators G1, G2 , .... Onto each of the six subcarrier signals, one of the six control signals, which have a low frequency of, for instance, only 50 Hz, is in turn modulated by amplitude modulation.

FIG. 3 shows in more detail the receivers E1, E2 shown in FIG. 1. These receivers E1, E2 all show essentially the same design, so that it suffices to consider the receiver E1 in detail.

According to FIG. 3, the transmission signal p received by the receiving antenna B1 arrives at the receiver E1 by way of the controllable impedance member I1. Here, it is applied directly to a ratio detector or, generally, a detector D1 which acts as a frequency demodulator. It is provided for demodulating the carrier frequency f. The output signal of the detector D1 is applied to a filter H1, which is tuned to the subcarrier frequency f1. The frequency, to which the filter H1 is tuned, therefore depends on the selected branch of the converter. The corresponding filter in the receiver E2 is therefore tuned to the subcarrier frequency f2. The filter H1 therefore passes a signal only if the corresponding control signal s1 is different from zero and thereby indicates the firing of the semiconductor valve V1 as desired.

The filter H1 is followed by an amplifier X1. Its output signal, which is still amplitude-modulated by the control signal s1, is fed to an amplitude demodulator P1. This amplitude demodulator P1, which demodulates the amplitude demodulation, is followed by a flipflop K1, in particular, a Schmitt trigger. This flipflop K1 assures that rectangular trigger pulses for the semiconductor valve V1 are formed. The flipflop K1 is connected on the output side to the control path of the semiconductor valve V1. The wave form of the trigger pulses delivered to the semiconductor valve V1 corresponds to the wave form of the control signal s1.

The receiver E2, which is assigned to the semiconductor valve V2, is designed similarly. Its filter is tuned, as already mentioned, to the subcarrier frequency f2. The trigger pulses for firing the semiconductor valve V2, delivered by the filter, therefore correspond to the control signal s2, as far as the wave form is concerned.

In a practical embodiment, in which the output power radiated by the transmitting antenna A is about 2 W, an input power of 2 mW has been found at the receiving antenna B1, which was placed at a distance of about 5 m. A parabolic reflector with a diameter of 2 m was used here as the transmitting antenna A for the carrier frequency of $F = 2.448$ GHz. As the received input power was relatively large, it was not necessary to amplify the input in the receiver E1. A high-pass filter has been used as the filter H1, whereby it is possible to eliminate low-frequency interference effectively.

FIG. 4 shows an embodiment of a combination RW circuit consisting of a return message receiver R and an evaluator circuit W.

According to FIG. 4, the received signal e, which consists of a mixture of the two return message signals r1 and r2, is first applied to an amplitude demodulator P. In the event of a defect of one of the semiconductor valves V1 or V2, e.g., of the semiconductor valve V1, the assigned return message signal, e.g., the return message signal r1, is missing. After amplitude demodulation in the amplitude demodulator P the received signal e is applied to two different filters N1 and N2. Each of these two filters N1 and N2, which may have only narrow bandwidth, is tuned to one of the characteristic frequencies n1 or n2. Therefore, only characteristic signals with the characteristic frequency in question are passed. These signals are applied separately to amplifiers Y1 and Y2, respectively, which are followed by respective flipflops T1 and T2, e.g., Schmitt triggers. These flipflops T1, T2 serve to form indicating signals a1, a2 which can be used to supply indicator lamps. The two indicating signals a1 and a2 are also fed to an OR member O, which forms from them a sum signal w. This sum signal w can be used to release an alarm. With this sum signal, protective measures for the semiconductor valves V1, V2 can also be released for the disturbed branch or for the entire converter.

In deviation from the illustration in FIG. 1, the converter may contain, for instance, a total of 1000 semiconductor valves. Thus, a total of 1000 return message signals r1, r2 ... r1000 with the characteristic frequencies n1, n2 ... n1000 may be contained in the received signal e. In this case, a total of 1000 filters N1, N2 ... N1000 of narrow bandwidth connected in parallel on the input side, must be provided. These are then tuned respectively to one of the characteristic frequencies n1, n2...n1000. The frequency spacing of these filters N1, N2 ... N1000 may, for instance, progressively be 100 Hz, the frequency 1.1 MHz, for instance, being provided as the characteristic frequency f1. Because of the built-in filters, the return message receiver is then selective. As a whole, it may be considered as an interrogation device which gives information regarding the condition of a semiconductor valve, which generally is not easily accessible.

The multiplicity of filters N1, N2 ... can be saved by using a single filter and by tuning its frequency stepwise in the interrogation, e.g., by 100 Hz, for instance, starting with the frequency 1.1 MHz. The use of a filter with stepwise variable frequency is more economical if a converter operates with a large number of semiconductor valves than the parallel application of a large number of filters with fixed frequency.

What is claimed is:

1. In apparatus for the wireless transmission of a control signal to the control path of a controllable semiconductor valve said apparatus including a high frequency transmitter including means for generating a carrier and means to modulate the carrier by the control signal to form a modulated signal and an antenna connected to said transmitter for radiating said modulated signal, and a high frequency receiver coupled to an antenna for receiving said modulated signal, said receiver including means for demodulating said signal and feeding the demodulated control signal to the control path of the semiconductor valve, the improvement comprising:
   a. means coupled to the semiconductor valve providing an output state signal representing the state of said semiconductor valve;
   b. a controllable reflecting modulation means terminating the antenna of the high frequency receiver, having a control input coupled to said means providing a state signal, for remodulating a portion of the received transmission and reflecting it as a return signal over said receiver antenna;
   c. a modulation dependent signal filter coupled to the antenna of the high frequency transmitter providing said return signal as an output; and
   d. a return signal receiver coupled to the output of said modulation dependent signal filter.

2. Apparatus according to claim 1 wherein said controllable reflecting modulation means comprises a controllable impedance having as control input said state signal.

3. Apparatus according to claim 2 wherein said means for providing said state signal comprises means for developing a binary signal representative of the state of said controlled valve and an identification frequency oscillator coupled to be switched on and off by said binary signal, the output of said oscillator being provided as the control signal to said impedance means; and wherein said return signal receiver is tuned to the identification frequency of said identification frequency oscillator.

4. Apparatus according to claim 3 wherein said controllable reflecting impedance means comprises a varactor.

5. Apparatus according to claim 3 wherein said controllable reflecting impedance means is a PIN diode.

6. Apparatus according to claim 2 wherein said means for providing said state signal comprises means for monitoring the voltage across said semiconductor valve coupled across the anode-cathode path of said valve.

7. Apparatus according to claim 2 wherein said modulation dependent signal filter is a circulator.

8. Apparatus according to claim 2 and further including an evaluation circuit coupled to said return signal receiver for providing an output to be evaluated by an operator.

9. Apparatus according to claim 1 wherein said high frequency transmitter includes a carrier generator for generating a carrier frequency and a subcarrier generator for generating a subcarrier frequency and wherein the means for modulating comprise a subcarrier modulator, having as inputs the control signal and the subcarrier, modulating said subcarrier with said control signal, a phase modulator, having as inputs said carrier and modulated subcarrier, frequency modulating said carrier with said subcarrier and a frequency multiplier multiplying said modulated carrier to form the transmitter signal.

10. Apparatus according to claim 9 wherein a plurality of semiconductors valves are to be controlled and wherein a plurality of subcarrier modulators are provided, each modulator having associated therewith a separate subcarrier frequency, said modulators amplitude modulating their respective subcarrier frequencies with a plurality of control signals, one associated with each semiconductor valve, the outputs of said plurality of modulators being provided to summing means, with the sum therefrom provided to said phase modulator for modulating said carrier frequency.

11. Apparatus according to claim 1 wherein a plurality of controllable semiconductor valves are to be controlled and wherein a plurality of separate high frequency receivers and associated antennas each having impedance means associated therewith and a separate identification frequency oscillator with each having a different identification frequency are provided and wherein said return signal receiver includes means for distinguishing between said different identification frequencies.

12. Apparatus according to 11 wherein said means for distinguishing comprises means for tuning said modulation dependent signal filter.

13. Apparatus according to claim 11 wherein said means for distinguishing comprise a plurality of modulation dependent signal filters each tuned to a separate one of said identification frequencies.

* * * * *